United States Patent

Steinlechner et al.

[11] Patent Number: 5,883,715
[45] Date of Patent: Mar. 16, 1999

[54] LASER VIBROMETER FOR VIBRATION MEASUREMENTS

[75] Inventors: Siegbert Steinlechner, Leonberg; Pawel Drabarek, Ditzingen; Michael Van Keulen, Stuttgart, all of Germany

[73] Assignee: Robert Bosch GmbH, Stuttgart, Germany

[21] Appl. No.: 793,140
[22] PCT Filed: Mar. 21, 1996
[86] PCT No.: PCT/DE96/00576
  § 371 Date: Feb. 19, 1997
  § 102(e) Date: Feb. 19, 1997
[87] PCT Pub. No.: WO97/01082
  PCT Pub. Date: Jan. 9, 1997

[30] Foreign Application Priority Data

Jun. 20, 1995 [DE] Germany ............... 195 22 272.5

[51] Int. Cl.[6] ................................................ G01B 9/02
[52] U.S. Cl. ..................... 356/349; 356/358; 356/28.5
[58] Field of Search ................... 356/28.5, 345, 356/349, 351, 361, 357

[56] References Cited

U.S. PATENT DOCUMENTS

| | | | |
|---|---|---|---|
| 4,886,363 | 12/1989 | Jungquist | 356/349 |
| 5,114,226 | 5/1992 | Goodwin et al. | 356/351 |
| 5,394,233 | 2/1995 | Wang | 356/28.5 |

OTHER PUBLICATIONS

FMAI et al., "Optical–Heterodyne Displacement Measurement using a Frequency–Ramped Laser Diode," Optics Communication, pp. 113–117, Aug. 1990.

M.Feser: "Schwingungen visualisieren". In: ATZ Automobiltechnische Zeitschrift 96 (1994), 7/8, pp. 433–435.

Kimio Tatsuno et al.: "Diode laser direct modulation heterodyne interferometer". In: Applied Optics, Jan. 1,1987, vol 26, No.1, pp. 37–40.

VIB–MAN–9308–e04, Vibrometer Operator' Manual, pp. 5–1 –5–11.

*Primary Examiner*—Robert Kim
*Attorney, Agent, or Firm*—Venable; George H. Spencer; Norman N. Kunitz

[57] ABSTRACT

A laser diode (1) of a laser vibrometer emits light which is guided onto a polarization beam splitter (3) by a lens 2. A portion of the beam is guided through directly to an imaging lens (4) and a second portion is deflected onto a mirror (5). Quarter-wave plates (6) and (7) are arranged between the polarization beam splitter and respectively the lens or the mirror. The beam which is reflected on the mirror is guided completely through the polarization beam splitter onto a photodetector unit (8). The beam reflected by the object (9) to be measured, which swings in the direction (14), is also deflected to the photodetector unit. The output signal of the photodetector unit, the interference signal generated from the superposition of the two reflected beams, is supplied to an electronic evaluation equipment (10). The latter is also supplied with a signal of a current modulator (11) which, on the other hand, supplies the laser diode with modulated injection current via line (12). The distance between the imaging lens and the object to be measured forms an optical detour (13) which is considerably lengthened compared to the reference arm.

10 Claims, 1 Drawing Sheet

LASER VIBROMETER FOR VIBRATION MEASUREMENTS

PRIOR ART

The invention is based on a laser vibrometer for vibration measurements which operates according to the principle of the heterodyne interferometer.

It is known that detailed vibration examinations are necessary, particularly in automobile manufacturing, to analyze resonance phenomena on components. For example, in an article "Schwingungen visualisieren" [Visualizing Vibrations] by Martin Feser in the ATZ Automobiltechnische Zeitschrift [Automotive Engineering Journal] 96 (1994) 7/8, page 433–435, a laser scanning vibrometer is described which determines the frequency spectrum for scanned measuring points by way of non-contacting laser Doppler measuring technology and fast FET analysis. A core element of this known scanning vibrometer is a one-point vibrometer. In the measuring head, the laser beam of an interferometer is guided with two scanning mirrors onto the surface to be examined. In addition to the laser interferometer and the scanning mirrors, the optical measuring head also comprises a video camera with which the object to be measured is observed. By way of the video image, the region to be scanned is defined with local resolution whose setting can be varied and the region is subsequently scanned by the laser beam. Because of the option of the frequency band selection, it is possible to determine the modes of the operating vibrations. The measuring system described here deals exclusively with the application for the measurement of surface vibrations, using in particular the example of automobile doors. By using a few defined frequencies, it is intended to determine points at which damping measures, necessary because of vibration amplitudes that are too large, should be determined and introduced already during the design phase, if possible.

This known laser vibrometer of the company Polytec GmbH, D-76337 Waldbronn, is described in detail in a manual VIB-MAN-9308-e04 in chapter 5 on pages 5-1 to 5-11, also with respect to the underlying physical measuring technology as well as the equipment configuration. For the necessary frequency shift, the laser beam is modulated by means of an acoustooptical modulator in the form of a Bragg cell. For the modulation, the Bragg cell is supplied with high-frequency power. This modulation of the reference laser beam thus requires a rather costly acoustooptical modulator which must be supplied with considerable high-frequency modulation power and, in addition, requires an extensive adjustment.

In an article "Diode laser direct modulation heterodyne interferometer" by Kimio Tatsuno and Yoshito Tsunoda in APPLIED OPTICS, Vol. 26, No. 1, 1 Jan. 1987, pages 37 to 40, an interferometer is provided for measuring the wave front aberration of optical heads in systems with optical plates, in which interferometer a frequency shift is generated by changing the injection current of the laser diode.

SUMMARY AND ADVANTAGES OF THE INVENTION

According to the present invention there is provided a laser vibrometer for vibration measurements which operates according to the principle of the heterodyne interferometer, and wherein in order to attain the necessary frequency shift ($\Delta v$), a modulation of the frequency of the laser radiation, preferably of a laser diode, occurs, and an interferometer arm, preferably the interferometer arm in the beam path to the object to be measured, is lengthened considerably compared to the reference arm, in particular, larger than 20 cm and up to approximately 100 cm.

In contrast, to the prior art vibrometer discussed above the laser vibrometer according to the invention having the features described above offers the advantage that the manner in which the necessary frequency shift is accomplished is much simpler. This manner is also much more economical and less elaborate with respect to the adjustment. Therewith, the invention makes available an economical, non-contacting, optical vibrometer which can be used in many different ways.

This is accomplished according to the core concept of the invention in that a modulation of the frequency of the laser radiation, preferably of the laser diode, occurs and an interferometer arm, preferably the interferometer arm in the beam path to the object to be measured, is lengthened considerably compared to the reference arm, in particular, larger than 20 cm and up to approximately 100 cm.

By way of further disclosed measures, advantageous modifications, improvements and advantageous applications of the above described laser vibrometer according to the invention are possible.

According to a particularly advantageous embodiment of the invention, the modulation of the frequency of the laser radiation occurs through modulating the laser injection current, in particular, by triangular-shaped or sawtooth-shaped modulation. Based on this modulation, the laser vibrometer of the invention can be referred to as a directly modulated laser vibrometer.

According to a useful modification of the laser vibrometer according to the invention, the triangular-shaped or sawtooth-shaped modulation takes place with an amplitude j of the current modulation and a frequency f of the current modulation, wherein the amplitude can be in the range of several mA and the frequency in the range from less than one up to several MHz.

A further advantageous feature of the laser vibrometer according to the invention provides that a Michelson interferometer is used for the vibration measurement, in particular, the axial, so-called out of plane vibration measurement.

According to a particularly advantageous feature of the laser vibrometer of the invention, a polarization beam splitter is provided having two quarter-wave plates, one each in the reference beam path and one each in the beam path of the object to be measured.

A first example of the particularly advantageous use of the laser vibrometer designed according to the invention provides that it is used for the vibration measurement on devices or components thereof to detect points which cause great and/or unpleasant noise.

A second example of the particularly advantageous use of the laser vibrometer designed according to the invention provides that it is used for the vibration measurement on devices or components thereof to detect points at which there exists risk of fracture and or the risk of premature wear due to high and/or, with respect to frequency, particularly critical vibration amplitudes.

A further example of the particularly advantageous use of the laser vibrometer designed according to the invention provides that it is used for the vibration measurement on devices or components thereof to detect rhythmically recurring vibrations which, in terms of their evaluation, are convertible particularly into rotational speeds of internal combustion engines.

BRIEF DESCRIPTION OF THE DRAWINGS

The invention is explained in greater detail in the description below by way of an embodiment which is illustrated in the drawing, wherein.

DETAILED DESCRIPTION OF THE PREFERRED EMBODIMENT

Figure 1:
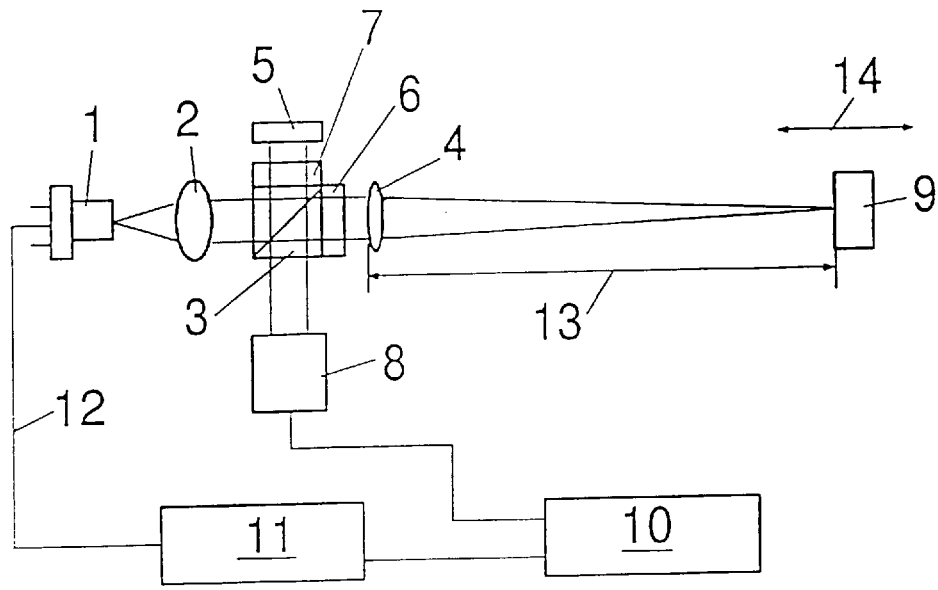
FIG. 1 is a schematic representation of the essential components of the directly modulated laser vibrometer designed according to the invention.

In a schematic representation, FIG. 1 shows the essential components of the directly modulated laser vibrometer designed according to the invention. A Michelson interferometer is used for the vibration measurement, in particular, the axial, the so-called out of plane vibration measurement. A laser diode 1 emits light which is guided in a parallel beam path onto a polarization beam splitter 3 by a lens 2. A portion of the beam is guided through directly to an imaging lens 4 and a second portion of the beam is deflected by 45° onto a mirror 5. Quarter-wave plates 6 and 7 are arranged between the polarization beam splitter 3 and respectively the lens 4 or the mirror 5. Here, the quarter-wave plate 7 has the effect that the beam which is reflected on the mirror 5 is turned such that it is guided completely through the polarization beam splitter 3 onto a photodetector unit 8. Here, the quarter-wave plate 6 has the effect that the beam, which is reflected by an object 9 to be measured, is deflected completely by 45° in the polarization beam splitter 3 and is guided into the photodetector unit 8.

The output signal of the photodetector unit 8, the interference signal generated from the superposition of the two reflected beams, is supplied to an electronic evaluation equipment 10. The latter is also supplied with a signal of a current modulator 11 which, on the other hand, supplies the laser diode 1 with modulated injection current j via a line 12 according to the invention. The distance between the imaging lens 4 and the object 9 to be measured forms an optical detour 13 or an arm of the interferometer. According to the invention, this interferometer arm 13 is considerably lengthened compared to the reference arm. The value, i.e., the length of this optical detour can be particularly larger than 20 cm and amount to up to approximately 100 cm. The object 9 to be measured vibrates particularly in the direction of the double arrow 14. This direction of vibration along the beam path is identified as the axial or out of plane direction.

Figure 2:
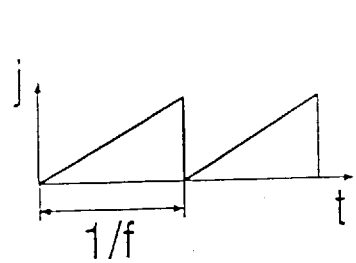
FIG. 2 schematically shows the sawtooth-shaped modulated injection current j of the laser diode over the time t.

As is shown in FIG. 2 by way of example, the injection current of the laser diode 1 is modulated in sawtooth shape or triangular shape, namely with the amplitude j and the frequency f. In FIG. 2, the amplitude j is plotted over the time t. As a result of a thermal effect, the optical length of the resonator is changed through the change of the refractive index. This generates a modulation of the frequency of the laser radiation. The frequency-current coefficient $\beta$ is different for different laser diodes and is a function of temperature and modulation frequency. It may, for example, have a size of approximately 3 GHz/mA.

As is shown in FIG. 1, the light beam of the laser diode 1 is divided in the polarization beam splitter 3. The returning waves, which are reflected by the mirror 5 and the object 9 to be measured reach the photodetector unit 8 at different times.

Figure 3:
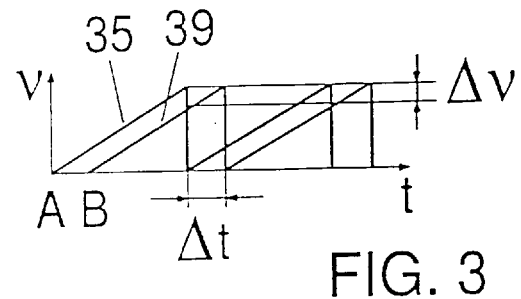
FIG. 3 schematically shows the frequency v, obtained on the basis of the direct modulation, over the time t to attain the heterodyne frequency $\Delta v$; and, FIG. 4 is a diagram with an interference output signal in the upper section and the associated laser diode injection current in the lower section.

In FIG. 3, the frequency v is plotted over the time t so as to schematically illustrate the relationships during the superposition of the signals arriving at the photodetector unit 8. The two reflected waves are identified by 35 and 39 and reach the photodetector unit 8 at the two different moments designated with A and B. The thus resulting transit time difference $\Delta t$ corresponds to the transit time of the laser light beam through the considerably lengthened interferometer arm 13 with the length $\Delta L$. From the transit time difference $\Delta t$ results a corresponding frequency difference $\Delta v$ for the two reflected waves 35 and 39. This frequency difference is also identified as the beat frequency or heterodyne frequency and can be determined with the assistance of the following equation:

$$\Delta v = j * \beta * f * \Delta L * C^{-1}$$

Figure 4:
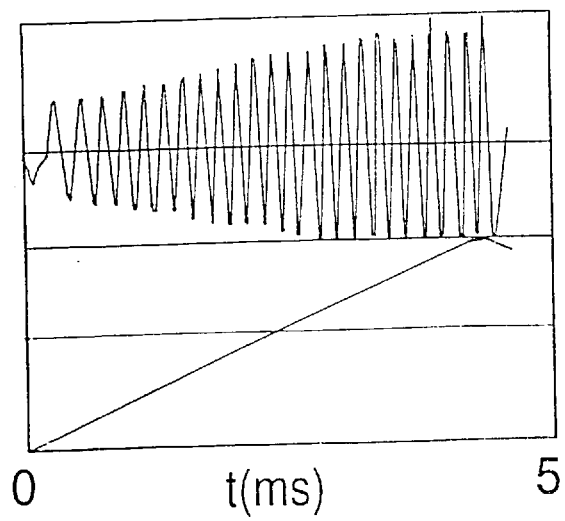

FIG. 4 illustrates over the time axis t, indicated here in milliseconds ms, in the upper section an example for a measured interference output signal, namely two light waves with different frequency, and in the lower section the associated sawtooth-shaped injection current.

By way of a numerical example and the equation indicated above, a value for the frequency shift is intended to be elucidated below:

| | |
|---|---|
| j = 2 mA | amplitude of the current modulation |
| $\beta$ = 3 * 10⁹ Hz/mA | frequency-current coefficient of the laser diode |
| f = 10⁶ Hz | frequency of the current modulation |
| $\Delta L$ = 2*50 cm – 1 m | double the distance between laser vibrometer and object |
| $\Delta v$ = 2*3*10⁹*10⁶/3*10⁸ $\rightarrow$ $\Delta v$ = 20 Mz. | |

Therewith, the invention provides a laser vibrometer which accomplishes the frequency shift required for recognizing the direction of the axial vibration of the object to be measured by simple means, direct current modulation of the laser diode and considerable lengthening of an interferometer arm.

This laser vibrometer designed according to the invention can be used with great benefit in many different areas of application in a particularly advantageous manner. Thus, according to a first example, it can be used in an especially advantageous manner to determine points for the vibration measurement on devices or components thereof which cause great and/or unpleasant noise or at which there exists risk of fracture and/or the risk of premature wear due to high and/or, with respect to frequency, particularly critical vibration amplitudes.

A further example of the especially advantageous use of the laser vibrometer designed according to the invention provides that it is used for the vibration measurement on devices or components thereof to detect rhythmically recurring vibrations which, in terms of their evaluation, are convertible particularly into rotational speeds of internal combustion engines.

We claim:

1. A laser vibrometer for vibration measurements which operates according to the principle of the heterodyne interferometer, comprising in combination: means including a laser diode for producing a parallel beam of light radiation; a Michelson interferometer including means for receiving the parallel beam and splitting same into first partial beam in a reference arm and a second partial beam in a measuring arm, with the first partial beam being reflected from a mirror disposed at a fixed position and the second partial beam being reflected from an object to be measured disposed at a known distance, and for combining the reflected partial beams to form an interference pattern in an interference arm, with one of the reference and measuring arms being considerably longer than the other by approximately 20 cm to approximately 100 cm; means for modulating the frequency of the laser produced radiation to attain a necessary frequency shift ($\Delta v$); a single detector for detecting the interference pattern in said interference arm; and an evaluation circuit means, responsive to the detected interference pattern and an output signal from said means for modulating representing the modulation, for providing an output signal corresponding to the axial out of plane vibration of the test object.

2. A laser vibrometer according to claim 1, wherein the means for modulating modulates the frequency of the laser radiation through modulating the laser injection current.

3. A laser vibrometer according to claim 2, wherein the means for modulating modulates the laser injection current with a triangular-shaped or sawtooth-shaped modulation.

4. A laser vibrometer according to claim 3, wherein the triangular-shaped or sawtooth-shaped modulation takes place with an amplitude j of the current modulation and a frequency f of the current modulation.

5. A laser vibrometer according to claim 4, wherein the amplitude of the modulation is in the range of 2 to 15 mA and the frequency of the modulation is in the range from less than one up to several MHZ.

6. A laser vibrometer according to claim 1, wherein the means for splitting includes a polarization beam splitter provided with two quarter-wave plates, one in the reference beam path and one in the beam path of the object to be measured.

7. A laser vibrometer according to claim 1, wherein the measuring arm is the longer arm.

8. A method of measuring the vibration of devices or components thereof to detect points which cause great and/or unpleasant noise comprising the step of:

providing a laser vibrometer which operates according to the principle of the heterodyne interferometer, and which comprises means including a laser diode for producing a parallel beam of light radiation; a Michelson interferometer including means for receiving the parallel beam and splitting same into first partial beam in a reference arm and a second partial beam in a measuring arm, with the first partial beam being reflected from a mirror disposed at a fixed position and the second partial beam being reflected from an object to be measured disposed at a known distance, and for combining the reflected partial beams to form an interference pattern in an interference arm, with one of the reference and measuring arms being considerably longer than the other by approximately 20 cm to approximately 100 cm; means for modulating the frequency of the laser produced radiation to attain a necessary frequency shift ($\Delta v$); a single detector for detecting the interference pattern in the interference arm; and an evaluation circuit means, responsive to the detected interference pattern and an output signal from said means for modulating representing the modulation, for providing an output signal corresponding to the axial out of plane vibration of the test object;

positioning the vibrometer such that the device constitutes the object to be measured; and, measuring the axial out of plane vibration of the device with the vibrometer.

9. A method of measuring the vibration of devices or components thereof to detect points at which there exists risk of fracture and/or the risk of premature wear due to high and/or, with respect to frequency, particularly critical vibration amplitudes; comprising the steps of:

providing a laser vibrometer which operates according to the principle of the heterodyne interferometer, and which comprises means including a laser diode for producing a parallel beam of light radiation; a Michelson interferometer including means for receiving the parallel beam and splitting same into first partial beam in a reference arm and a second partial beam in a measuring arm, with the first partial beam being reflected from a mirror disposed at a fixed position and the second partial beam being reflected from an object to be measured disposed at a known distance, and for combining the reflected partial beams to form an interference pattern in an interference arm, with one of the reference and measuring arms being considerably longer than the other by approximately 20 cm to approximately 100 cm; means for modulating the frequency of the laser produced radiation to attain a necessary frequency shift ($\Delta v$); a single detector for detecting the interference pattern in the interference arm; and an evaluation circuit means, responsive to the detected interference pattern and an output signal from said means for modulating representing the modulation, for providing an output signal corresponding to the axial out of plane vibration of the test object;

positioning the vibrometer such that the device constitutes the object to be measured; and, measuring the axial out of plane vibrations of the device with the vibrometer.

10. A a method of measuring the vibration of devices or components thereof to detect rhythmically recurring vibrations which, in terms of their evaluation, are convertible into rotational speeds of internal combustion engines comprising the steps of:

providing a laser vibrometer which operates according to the principle of the heterodyne interferometer, and which comprises means including a laser diode for producing a parallel beam of light radiation; a Michelson interferometer including means for receiving the parallel beam and splitting same into first partial beam in a reference arm and a second partial beam in a measuring arm, with the first partial beam being reflected from a mirror disposed at a fixed position and the second partial beam being reflected from an object to be measured disposed at a known distance, and for combining the reflected partial beams to form an interference pattern in an interference arm, with one of the reference and measuring arms being considerably longer than the other by approximately 20 cm to approximately 100 cm; means for modulating the frequency of the laser produced radiation to attain a necessary frequency shift ($\Delta v$); a single detector for detecting the interference pattern in the interference arm; and an evaluation circuit means, responsive to the detected interference pattern and an output signal from said means for modulating representing the modulation, for providing an output signal corresponding to the axial out of plane vibration of the test object;

positioning the vibrometer such that the device constitutes the object to be measured; and, measuring the axial out of plane vibrations of the device with the vibrometer.

* * * * *